United States Patent [19]

Uchikoshi et al.

[11] 3,900,888

[45] Aug. 19, 1975

[54] PROCESS FOR DETECTING AND ADJUSTING A VERTICAL ORIENTATION OF MAGNETIC HEADS AND APPARATUS THEREFOR

[75] Inventors: Goji Uchikoshi; Niro Nakamichi, both of Tokyo, Japan

[73] Assignee: Nakamichi Research Inc., Tokyo, Japan

[22] Filed: Aug. 30, 1973

[21] Appl. No.: 393,049

[30] Foreign Application Priority Data

| | | |
|---|---|---|
| Oct. 3, 1972 | Japan | 47-99292 |
| Dec. 22, 1972 | Japan | 47-129061 |
| Dec. 13, 1972 | Japan | 47-118336[U] |

[52] U.S. Cl. .................. 360/76; 318/653; 360/109

[51] Int. Cl.$^2$.... G11B 5/56; G11B 5/43; G11B 5/48

[58] Field of Search ................ 360/76, 109, 77, 78; 318/653, 608; 324/83

[56] References Cited

UNITED STATES PATENTS

| | | | |
|---|---|---|---|
| 2,943,860 | 7/1960 | D'arcy | 360/109 |
| 3,176,084 | 3/1965 | Pollaschek | 360/109 |
| 3,185,972 | 5/1965 | Sippel | 360/76 |
| 3,414,816 | 12/1968 | Tobey et al. | 360/76 |
| 3,699,555 | 10/1972 | Du Vall | 360/78 |

*Primary Examiner*—Alfred H. Eddleman
*Attorney, Agent, or Firm*—Woodling, Krost, Granger & Rust

[57] ABSTRACT

A process for detecting vertical orientation of a magnetic reproducing head having a slit gap divided into a plurality of channel portions, wherein a reference tape is employed which has a plurality of A.C. signals recorded on the respective tracks by engagement of said reference tape with a reference recording head having a slit gap disposed substantially in a direction perpendicular to its running direction. The reference tape is made to pass in engagement with the magnetic reproducing head to be measured to reproduce said signals from the channel portions of the reproducing magnetic head. If the reproducing magnetic head is inclined out of proper vertical orientation, then there is a phase difference between said reproduced signals which signals an indicator to indicate the inclination of the magnetic reproducing head for its adjustment to a proper vertical orientation. Alternatively, the phase difference between the reproduced signals instructs the magnetic reproducing head to be automatically adjusted to a proper vertical orientation.

8 Claims, 11 Drawing Figures

FIG. 1
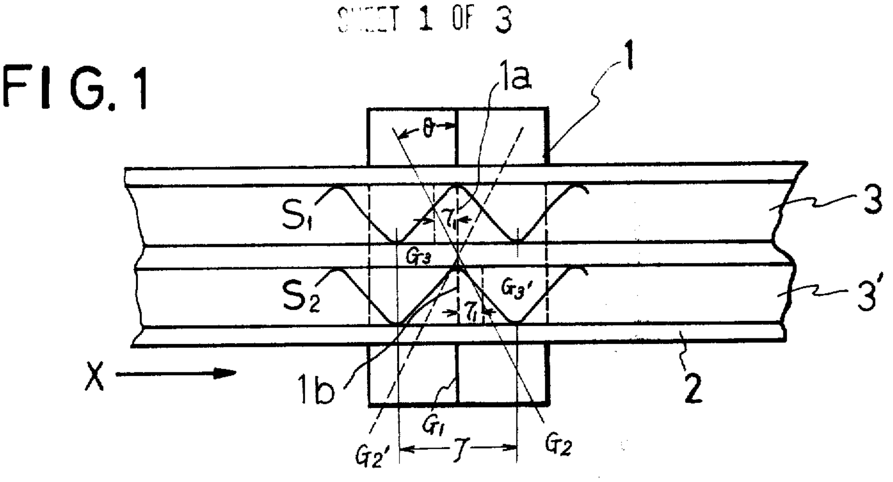
FIG. 2
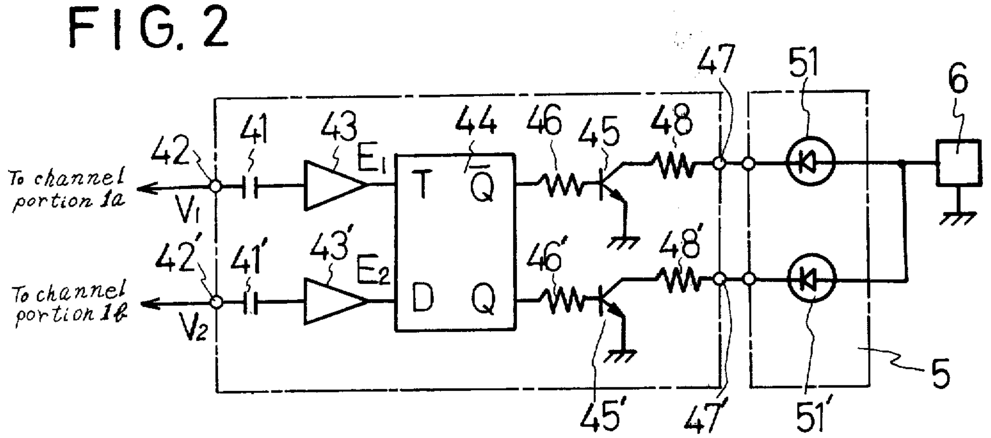
FIG. 3
| D | Q |
|---|---|
| L | L |
| H | H |
FIG. 4
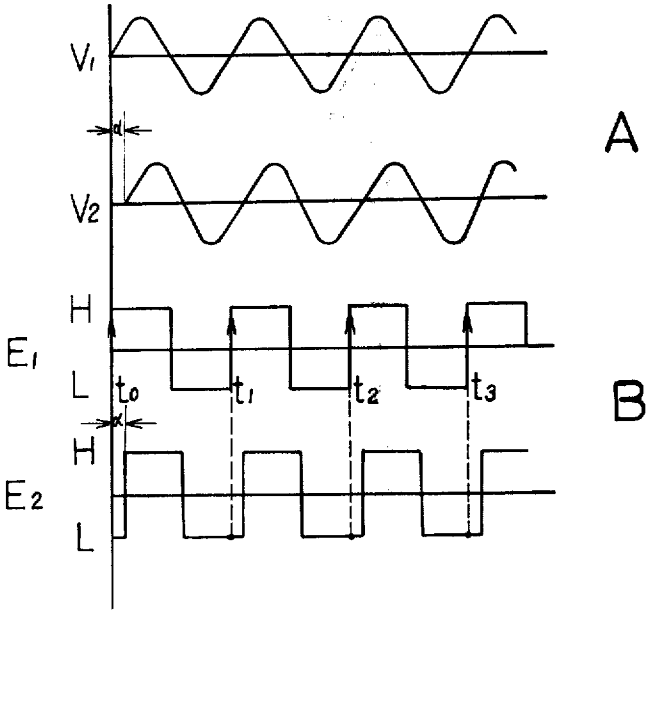

PROCESS FOR DETECTING AND ADJUSTING A VERTICAL ORIENTATION OF MAGNETIC HEADS AND APPARATUS THEREFOR

FIELD OF THE INVENTION

This invention pertains generally to a magnetic head for use in a magnetic recording and/or reproducing apparatus and more particularly to an apparatus for indicating and/or automatically adjusting a magnetic head to a proper vertical orientation.

BACKGROUND OF THE INVENTION

With the advance of high density of a magnetic recording medium at which magnetic recording is effected, it is critically required to place the magnetic head severely in vertical orientation. Especially, appearance of a matrix four channel type tape recorder requires high degree of vertical orientation for the magnetic head thereof to reproduce a real sound field. At present, high fidelity tape recorder requires the magnetic head in its vertical orientation to range within the deviation of plus or minus 1 to 2 minutes away from the proper vertical orientation in order to provide satisfactory performance to the tape recorder. In a stereo tape recorder in which a magnetic head includes a plurality of channel portions therein, a magnetic tape accordingly has respective channel parts of acoustic signals to be recorded and reproduced thereon in a phase identical to each other and therefore, if the magnetic head would fail to be mounted in a vertical manner, then there will occur deviation in phase between the respective channel parts of acoustic signals to provide an undesired acoustic effect thereto.

Generally, a mount to which a magnetic head is secured is floatingly mounted through spring means on a frame and adjusted in position by a screw, threadedly extending through the frame and engaging the mount, so that the magnetic head may be adjusted in its vertical orientation, in its back and forth inclinement and in its level. However, such adjustment of the magnetic head requires high degree of skill for an operator to thereby cause the magnetic head to be difficult to have a proper vertical orientation thereto. More particularly, in order to adjust the magnetic reproducing head to provide a proper orientation thereto, a magnetic tape with a reference signal recorded thereon is usually reproduced through the magnetic head to be measured to produce the acoustic output therefrom. The output is observed by the operator with an instrument, such as a vacuum-tube voltmeter, an oscillo-scope or the like, across which the output is applied and the operator manually operates the screw as he seeks to observe the maximum point in the instrument, so that the magnetic head is adjusted tp its proper position. Thus, the operator is required to have high degree of skill due to the maximum point of the instrument having a relatively broader range and in addition accurate measurement of vertical orientation of the magnetic head requires the magnetic tape with the reference signal of high frequency recorded thereon, resulting in an expensive installation.

The screw to adjust the mount and therefore, the magnetic head disadvantageously has a clearance which is produced between the screw and the threaded hole in the frame through which the former extends to thereby promote disengagement of the screw out of the threaded hole due to its subjection to vibration, and impact, with the result that misallignment of the magnetic head occurs. It will be understood that the adjusting screw cannot be permanently fixed in position because the magnetic head is required to be often adjusted in vertical orientation corresponding to the running condition of the magnetic tape engaging with the magnetic head.

OBJECTS OF THE INVENTION

Accordingly, it is a principle object of the present invention to provide an indicating system adapted to facilitate the adjustment by the operator of the magnetic reproducing head in vertical orientation.

It is further object of the present invention to provide a system for automatically adjust the magnetic head to a proper vertical orientation.

It is another object of the present invention to provide a mounting device to mount a magnetic head so that the magnetic head is stably fixed in position once it is properly positioned.

SUMMARY OF THE INVENTION

In accordance with one aspect of the present invention, there is provided a process for detecting a vertical orientation of a magnetic reproducing head, said head having a slit gap divided into a plurality of channel portions, comprising the steps of preparing a reference tape with a plurality of A.C. signals having the same phase recorded on the respective tracks thereof by engagement of said reference tape with a reference magnetic recording head having a slit gap disposed substantially in a direction perpendicular to its running direction, running said reference tape in engagement with said magnetic reproducing head to be measured to thereby reproduce said signals from the respective tracks of said magnetic reproducing head and discriminating the phase difference between said reproduced signals from the respective reproducing head tracks whereby the vertical orientation of said magnetic reproducing head is detected for its adjustment to a proper vertical orientation.

In accordance with another aspect of the present invention, there is provided a process for detecting a vertical orientation of a magnetic recording head, said head having a slit gap divided into a plurality of channel portions, comprising the steps of running a blank magnetic tape having a plurality of tracks in engagement with said magnetic recording head to record a plurality of A.C. signals on the respective tracks of said magnetic tape, then running said magnetic tape with said signals recorded thereon, in engagement with a reference magnetic reproducing head with a slit gap disposed substantially in a direction perpendicular to its running direction to thereby reproduce said signals from the respective tracks of said reference magnetic reproducing head and discriminating the phase difference between said signals whereby the vertical orientation of said magnetic recording head is detected for its adjustment to a proper orientation.

In accordance with another aspect of the present invention, there is provided a process for detecting a vertical orientation of magnetic reproducing and recording heads of a magnetic recording and reproducing apparatus, said heads each having a slit gap divided into a plurality of channel portions, comprising the steps of preparing a reference tape with a plurality of A.C. signals having the same phase recorded on the respective tracks thereof by engagement of said reference tape with a reference magnetic recording head having a slit gap disposed substantially in a direction perpendicular to its running direction, running said reference tape in engagement with said magnetic reproducing head to be measured to thereby reproduce said signals from the respective tracks of said magnetic reproducing head, discriminating the phase difference between said reproduced signals from the respective reproducing head tracks whereby the vertical orientation of said magnetic reproducing head is detected for its adjustment to a proper orientation, thereafter running a blank magnetic tape having tracks of the corresponding number in engagement with said magnetic recording head to be measured to thereby record a plurality of A.C. signals having the same phase on the respective tracks of said magnetic recording head, then running said second magnetic tape with second signals recorded thereon, in engagement with said magnetic reproducing head of proper orientation to reproduce said second signals from the respective tracks of said magnetic reproducing head and discriminating the phase difference between said second signals whereby the vertical orientation of said magnetic recording head is detected for its adjustment to a proper orientation.

In accordance with another aspect of the present invention, there is provided an apparatus for detecting a vertical orientation of a magnetic reproducing head, said head having a slit gap divided into a plurality of channel portions, comprising a reference tape with a plurality of A.C. signals having the same phase recorded on its respective tracks by engagement of said tape with a reference recording head with a slit gap disposed substantially in a direction perpendicular to its running direction, a phase discriminating circuit associated with said magnetic reproducing head at its channel outputs to detect the phase difference between the reproduced signals from said channel outputs of said magnetic reproducing head and an indicator to indicate the inclination and its direction of said magnetic reproducing head in response to the phase difference of one of the reproduced output signals advanced or retarded relative to the other reproduced output signal.

In accordance with another aspect of the present invention, there is provided an apparatus for automatically adjusting a vertical orientation of a magnetic reproducing head, said head having a slit gap divided into a plurality of channel portions, comprising means to support said magnetic head and movable so that said magnetic head is allowed to be adjusted in its vertical orientation, actuating means to actuate said means to support said magnetic head, a reference tape with a plurality of A.C. signals having the same phase recorded on its respective tracks by engagement of said tape with a magnetic recording head having a slit gap disposed substantially in a direction perpendicular to its running direction, a phase discriminating circuit associated with said magnetic reproducing head at its channel outputs to detect the phase difference of one of the reproduced signals from said magnetic reproducing head advanced or retarded relative to the other reproduced signal whereby said actuating means is actuated in either of the directions in response to said phase difference between said reproduced signals.

BRIEF DESCRIPTION OF THE DRAWINGS

The above and other objects and features of the present invention will become apparent to those skilled in the art from the teaching of the following description of the embodiments taken in connection with the accompanying drawings;

FIG. 1 shows the relationship of a magnetic reproducing head to be measured in vertical orientation and a reference tape having signals recorded thereon in the same phase to one another;

FIG. 2 is a schematic diagram showing a phase discriminating circuit associated with the respective channel parts of the magnetic head at the output thereof and an indicator connected to the phase discriminating circuit;

FIG. 3 is a truth table of a D-type edge trigger flipflop embodied in the phase discriminator shown in FIG. 2;

FIGS. 4A and 5A are time charts of the input voltages supplied from the magnetic head to the input of the phase discriminator shown in FIG. 2 when the magnetic head is inclined out of a proper vertical orientation;

FIGS. 4B and 5B are time charts of the output voltage from the phase discriminator in response to the input voltage applied thereto;

DETAILED DESCRIPTION OF PREFERRED EMBODIMENTS

Figure 5:
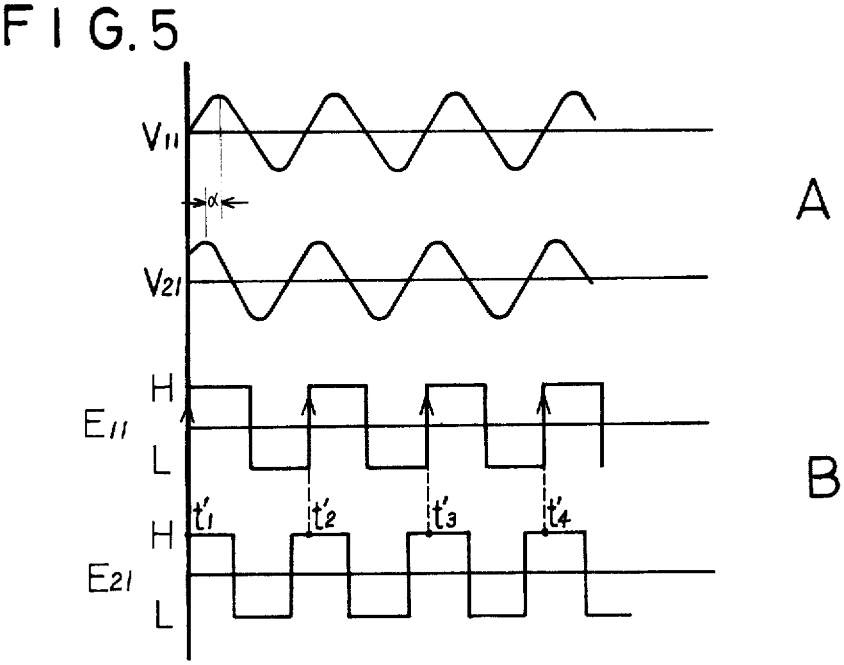

Prior to the description of embodiments according to the present invention, a principle of the invention will be illustrated with reference to FIG. 1, wherein an audio stereo magnetic reproducer comprises a magnetic reproducing head 1 having two channels 1*a* and 1*b* provided thereon. The magnetic head may be mounted in a base of the reproducer in any of suitable manners, one of which will be described later in connection with FIG. 6 in more detail. In order to measure a vertical orientation or inclination out of a proper orientation of the magnetic head 1, a reference magnetic tape 2 is prepared which has reference A.C. signals recorded in the same phase to one another on the respective tracks 3 and 3′ of the tape 2 corresponding to the channels of the magnetic head 1. This may be accomplished in a manner in which the tape 2 engagingly runs a magnetic recording head (not shown) with a slit gap disposed substantially in a direction perpendicular to its running direction. $S_1$ and $S_2$ designate the forms of the reference signals recorded on the magnetic tape 2.

On measuring the magnetic reproducing head 1 in its vertical orientation, the reference magnetic tape 2 engages and passes the magnetic head 1 to be measured. If the magnetic head 1 is disposed substantially in vertical orientation with the slit gap of the magnetic head positioned as indicated by the letter "$G_1$" in FIG. 1, then the magnetic reproducing head 1 produces A.C. signals in the same phase therefrom.

If the magnetic reproducing head 1 is disposed relative to the base of the tape reproducer with the slit gap of the magnetic head inclined in a counter-clockwise direction at a degree of $\theta$ as indicated by the letter $G_2$ of FIG. 1, then the magnetic head 1 produces the reproducing outputs of smaller absolute value therefrom, which, it should be noted, have the phase difference therebetween. More particularly, with the slit gap of the magnetic head 1 inclined as indicated by the letter $G_2$, the magnetic head 1 is deemed to have the gaps corresponding to the channel portions 1a and 1b positioned at points indicated at $G_3$ and $G_3'$. Thus, provided the magnetic tape 2 is running in a direction indicated by an arrow X of FIG. 1, the output voltage from the channel portion 1*a* of the magnetic head 1 will advance in phase by the degree of 360°

$$x \frac{2\lambda_1}{\lambda}$$

(wherein $\lambda$ is tape length corresponding to one cycle of the recorded signal form and $\lambda_1$ is the distance along the longitudinal axis of the tape between the proper point $G_1$ and the false points $G_3$ and $G_3'$ of the head gaps), compared to the output voltage from the channel portion 1*b* of the magnetic head 1. Similarly, if the magnetic head 1 is disposed with the slit gap inclined in a clockwise direction at a degree of $\theta$ as indicated by the letter $G_2'$ of FIG. 1, it will be appreciated that the output voltage from the channel portion 1b will advance in phase by the same degree, compared to that from the channel portion 1a of the magnetic head 1.

Thus, it will be noted that the operator can easily adjust the magnetic reproducing head 1 to a proper vertical orientation, so that there is no phase difference between the output voltages from the channel portions 1*a* and 1*b* of the magnetic head 1 while they are being discriminated.

Referring now to FIG. 2, there is shown a system for detecting in phase difference the output voltages from the channel portions 1*a* and 1*b* of the magnetic reproducing head 1 and this system comprises a phase discriminator 4 and an indicator 5.

The phase discriminator 4 may comprise coupling capacitors 41 and 41', one ends of which are connected to respective inputs 42 and 42' receiving the output voltages from the channel portions 1*a* and 1*b* and the other ends of which are connected to respective inputs of amplifiers 43 and 43' which are in turn connected to inputs of a flip-flop circuit 44. The flip-flop circuit 44 may comprise a commercially available D-type edge trigger flip-flop which is so constructed that when input terminal T of the flip-flop receives clock pulses only at the instant of the respective pulses changing from low level to high level, the flip-flop reads the input condition of input terminal D, that is low or high level of the pulse at terminal D and issues output signal of low or high level from output terminal Q and output signal of high or low level from output terminal $\bar{Q}$, simultaneously serving to close it so that the input condition of terminal D is prevented from entering the flip-flop 44 and that unless the clock pulses change from low to high levels the input condition of terminal D has no effect on the outputs Q and $\bar{Q}$ of the flip-flop. FIG. 3 shows the truth table of the D-type edge trigger flip-flop. It will be noted that the flip-flop 44 may be alternatively replaced by any of other components.

The flip-flop 44 has the respective output terminals Q and $\bar{Q}$ connected to bases of respective transistors 45 and 45' through resistors 46 and 46' and the emitters of the transistors 45 and 45' are grounded to earth. The collectors of the transistors 45 and 45' are connected to respective outputs 47 and 47' of the phase discriminator 4 through respective resistors 48 and 48'.

The indicator 5 may comprise luminescence diodes 51 and 51' the cathodes or inputs of which are connected to the outputs 48 and 48' of the phase discriminator 4 and the anodes of which are connected to a D.C. source 6. It will be noted that the indicator 5 may be alternatively in the form of any other conventional means, such as a voltmeter or the like.

In operation, as previously mentioned, when the reference magnetic tape 2 of FIG. 1 engages and runs through the magnetic reproducing head 1 with the slit gap inclined as shown at $G_2$ in FIG. 1, the magnetic head 1 reproduces the output voltages $V_1$ and $V_2$ of sine wave form displaced out of phase by the degree of $\alpha$ as shown in FIG. 4A and the output voltages $V_1$ and $V_2$ are applied to the inputs 42 and 42' of the phase discriminator 4, respectively. The voltages $V_1$ and $V_2$ are integrated by the capacitors 41 and 41' and amplified by the amplifiers 43 and 43' to be converted into voltages of rectangular wave form or clock pulses $E_1$ and $E_2$ as shown in FIG. 4B. It will be understood that the clock pulses $E_1$ and $E_2$ are displaced out of phase by the degree of $\alpha$ in response to the input voltages $V_1$ and $V_2$. It will be also noted that the phase angle $\alpha$ corresponds to 360°

$$x \frac{2\lambda_1}{\lambda}$$

as previously described in connection with FIG. 1.

The output voltages $E_1$ and $E_2$ from the amplifiers 43 and 43' are applied to the respective inputs T and D of the flip-flop 44 which in turn produces the output signals at the outputs Q and $\bar{Q}$ thereof at the moment that the input T receives each of the pulses $E_1$ changing from the low level L to the high level H. In FIG. 4B, the moments that the pulses $E_1$ changes from L to H are indicated at $t_0$, $t_1$, $t_2$ and $t_4$, respectively. At that time, the input D of the flip-flop 44 receives the low level L of the pulses $E_2$ with the result that the output Q of the flip-flop 44 produces the low level therefrom while the output $\bar{Q}$ produces the high level. Accordingly, the transistor 45 has the base current flowing through the base and emitter thereof to turn on while the transistor 45' remains turned off. Therefore, the luminescence diode 51 is radiative while the luminescence diode 51' is non-radiative resulting in that the operator will find the magnetic head 1 to be oriented with the slit gap inclined counter-clockwise as viewed in FIG. 1. Thus, the operator can adjust the magnetic head 1 so as to correct the vertical orientation of the magnetic head until the luminescence diode 51 discontinues to light.

Similarly, if the magnetic reproducing head 1 is positioned with the slit gap inclined in a clockwise direction as indicated at $G_2'$ of FIG. 1, then the magnetic head 1 produces the output voltages $V_{11}$ and $V_{21}$ therefrom which are converted into the voltages of rectangular wave form or clock pulses $E_{11}$ and $E_{21}$ at the outputs of the amplifiers 43 and 43'. Accordingly, the flip-flop 44 produces the high level signal from the output Q thereof so that the transistor 45' turns on and the low level signal from the output $\bar{Q}$ thereof so that the transistor 45 turns off. This causes the luminescence diode 45' to light and the luminescence diode 45 to maintain unlighted and the operator can find the magnetic head 1 to be oriented with the slit gap inclined clockwise. Thus, the operator can adjust the magnetic head in a manner previously mentioned.

If the magnetic head 1 is properly oriented in a vertical direction or when the operator has adjusted the magnetic head 1 with the slit gap oriented in a properly vertical direction, then the D-type edge trigger flip-flop receives the input voltages of no phase difference. As a result when the input T of the flip-flop 44 receives the input pulse at the moment of its changing from the low to high level the input D of the flip-flop receives the input pulse changing from low to high level, which causes the output Q of the flip-flop 44 to produce unstable signal of high or low level depending upon its transit condition and the output $\bar{Q}$ to produce similarly unstable signal of low or high level. It will be considered that the provability of high and low levels of both the output signals at the outputs Q and $\bar{Q}$ of the flip-flop 44 is ½ with the result that the luminescence diodes become alternately flickered.

It should be noted that the present invention can be also applied to the adjustment of a recording magnetic head to a proper vertical orientation. In case that a magnetic recording and reproducing apparatus is of three head type, after the reproducing head adjusted in a manner as above-mentioned, then a blank magnetic tape engagingly passes a magnetic recording head to be adjusted, so that signals of sine wave are recorded on the respective track portions of the tape, and thereafter engagingly passes the previously adjusted magnetic reproducing head, from which the phases discriminator as shown at 4 in FIG. 2 receives the reproduced voltages. The operator can adjust the recording magnetic head in vertical orientation while monitoring the indicator as shown at 5 in FIG. 2 until the luminescence diodes 51 and 51' will be flickered.

Alternatively, if the magnetic reproducing head of the apparatus is properly pre-orientated with the slip perpendicular to the running direction of the magnetic tape engaging with the magnetic reproducing head, then the blank tape passes and engages the magnetic recording head to be adjusted to thereby record the signals on the magnetic tape, after which the magnetic recording head can be adjusted in a manner aforementioned.

Especially, in case where the magnetic tape recording and/or reproducing apparatus has multi-channel head or heads, the output voltages from two channel portions of the head mostly farther from each other may be prefarably applied to the phase discriminator so that precise adjustment of the head will be effected.

It should be noted that the feature of the phase discriminator including the D-type edge trigger flip-flop is that it has excellent resolution of phase difference because it has response time of nano second order. Therefore, although the head or heads are adjusted by using reference signals of 400 Hz, audio signals of 18 KHz are assured to be satisfactorily recorded on or reproduced from the magnetic tape.

Figure 6:
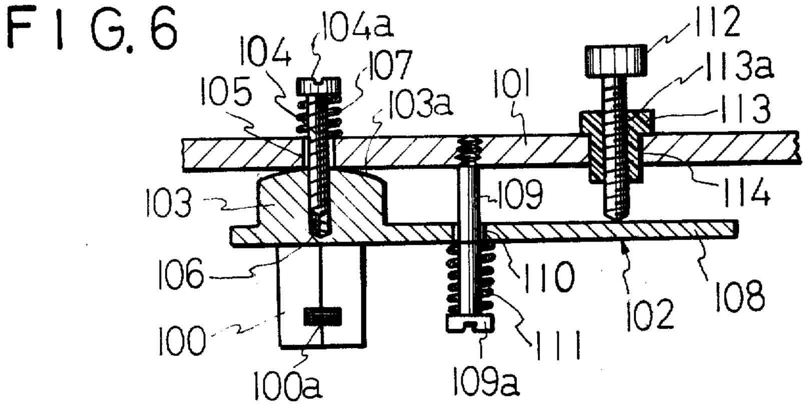
FIG. 6 is a front view of a magnetic reproducing head mounted on a base of a magnetic tape reproducer with the portions thereof taken in cross section.

Referring now to FIG. 6, there is illustrated a reproducing magnetic head 100 mounted on a base 101 of a magnetic tape reproducing and recording apparatus. A mounting member 102 is provided which has the magnetic head 100 secured to the mounting member with a slit gap 100*a* of the magnetic head 100 disposed in a vertical direction. The mounting member 102 is provided with an upwardly extending portion 103 integral with the mounting member and disposed at the opposite side thereof to the magnetic head 100 in engagement with the inner surface of the base. The upwardly extending portion 103 on the mounting member 102 has an arcuate face 103*a* so that the mounting member 102 angularly moves about contact point of the upwardly extending portion 103 and the inner surface of the base 101. A threaded screw 104 loosely extends through a hole 105 in the base 101 and is threaded into a tapped bore 106 in the upwardly extending portion 103 and a coil spring 107 is compressedly disposed around the threaded screw 104, one end of which engages a screw head 104*a* and the other end of which seats against the outer surface of the base 101, so that the mounting member 102 is resiliently suspended from the threaded screw 104 on the base.

The mounting member 102 is provided with an extension 108 substantially parallel to the base, which extension at the intermediate portion thereof is suspended from a screw rod 109 extending through a hole 110 in the extension 108 and at the threaded end thereof threaded into the base 101 and urged upwardly or in a counterclockwise direction about the contact point of the portion 103 and the base by a compressed coil spring 111, one of the ends of which bears against the lower surface of the extension 108 and the other end of which seats against a rod head 109*a*.

In order to adjust the level of the extension 108 and therefore, the vertical orientation of the magnetic head 100, an adjusting screw 112 at the tip thereof engaging the extension 108 is provided which is forcedly threaded into a hole 113a in a resilient bush 113 which is in turn forcedly fitted into a hole 114 in the base 101. The resilient bush 113 may be preferably bonded to the wall of the hole 114 in the base 101 and may comprise elastomeric material having a relatively small coefficient of friction, such as nylon, teflon or the like. The adjusting screw 112, when forcedly screwed into the resilient bush 113, is held in position because of the resilient bush compressed against the outer periphery of the adjusting screw so that the extension of the mounting member 103 is maintained at a predetermined position.

Thus, once the operator has adjusted the reproducing magnetic head 100 by moving the adjusting screw 112 into or out of the resilient bush 113 so that the slit gap 100*a* of the head is properly disposed in vertical orientation, it is assured to be held in position even though it is subject to vibration, which otherwise tends to get out of proper orientation. In addition, the operator can smoothly adjust the magnetic head because of the adjusting screw resiliently grasped by the resilient bush 113.

Figure 8:
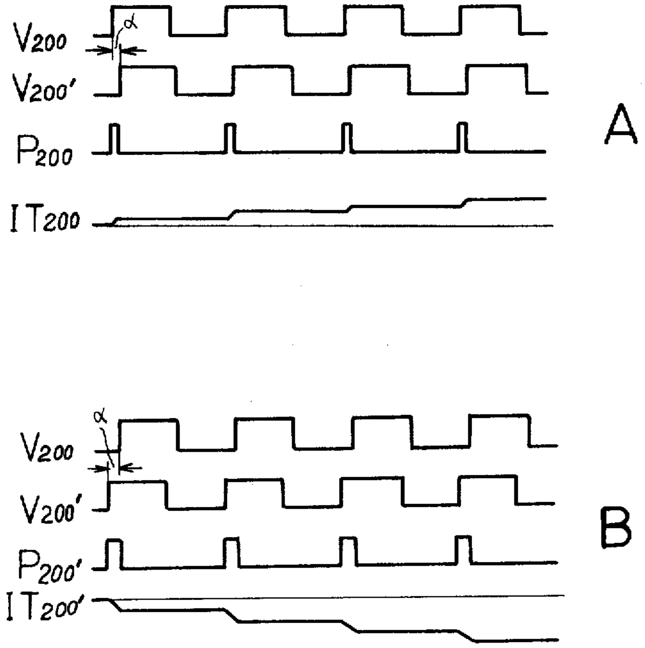
FIGS. 8A and 8B are time charts of the input and output voltages of a phase discriminator and the output of an integrator, both employed in the system shown in FIG. 7.
Figure 7:
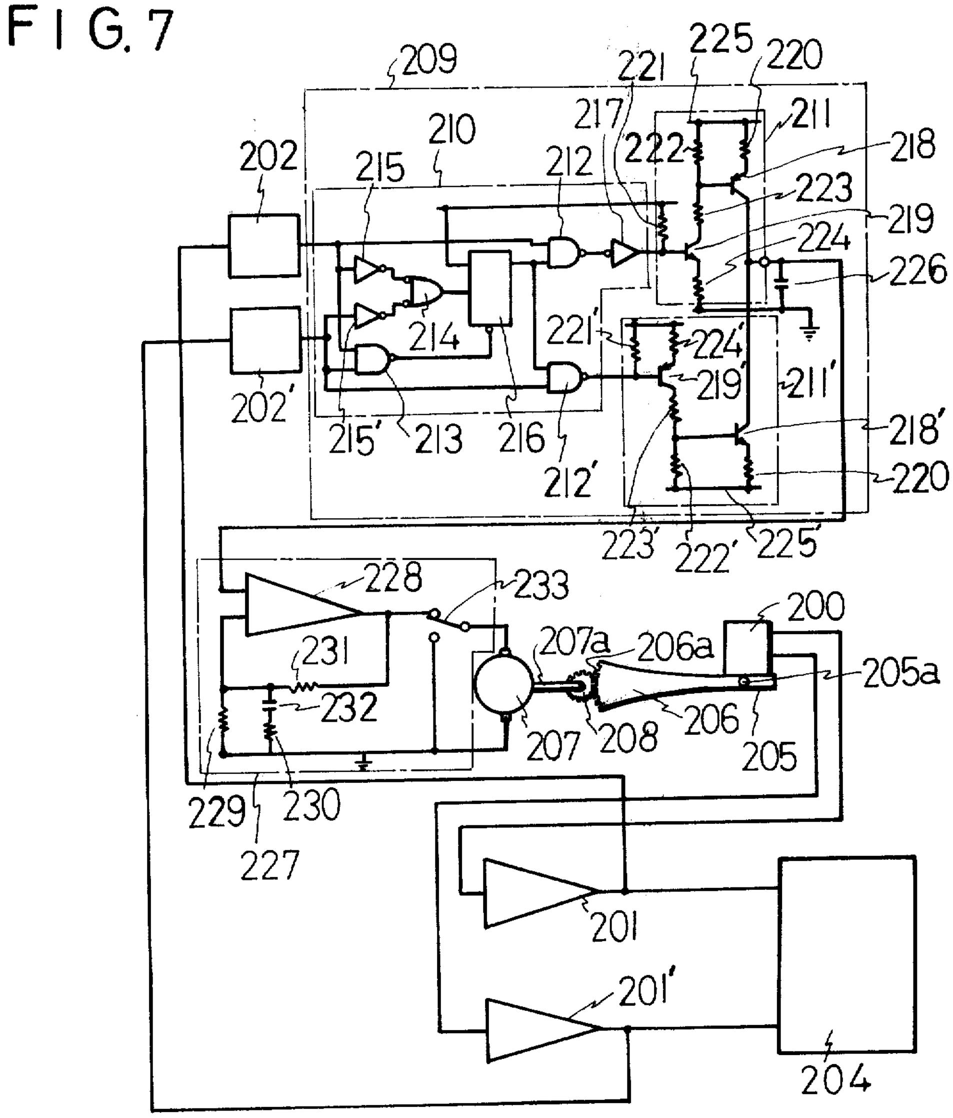
FIG. 7 is a schematic diagram of a system for automatically adjust a vertical orientation of a magnetic reproducing head in a magnetic tape reproducer.

Referring now to FIG. 7, there is illustrated a preferred embodiment of a system for automatically adjusting a reproducing magnetic head of a two channel stereo tape recorder to a proper vertical orientation wherein outputs from respective channels of a magnetic head 200 are applied to respective amplifier 201 and 201' which at the outputs thereof are in turn connected to respective shaping circuits 202 and 202'. The shaping circuits 202 and 202' shape or deform the amplified output voltages from the amplifiers 201 and 201' into ones of rectangular wave form as shown in FIGS. 8A and 8B in a conventional manner. It will be appreciated that the amplifiers 201 and 201' are also connected to an electro acoustic transducer 204 which has not constituted a portion of the present invention and therefore will not be described in further detail.

The magnetic head 200 is illustrated in FIG. 7 to be schematically mounted on a mounting member 205 pivoted about a pivot axis 205*a* on a base (not shown). The mounting member 205 may be provided at the remote end of the member from the pivot axis thereof with a sectorial portion 206 integral with the mounting member 205 and having teeth 206*a* provided on the outer periphery thereof. A reversible electric motor 207 is provided which includes an output shaft 207*a* having a pinion 208 secured thereto and meshed with the teeth 206*a* on the sectorial portion 206 of the mounting member 205 so that the rotation of the electric motor 207 causes the mounting member 205 to pivotally move about the pivot axis thereof.

The outputs of the shaping circuits 202 and 202' are connected to a phase discriminator 209 comprising a logical operating circuit 210 and a pair of current generator 211 and 211'.

The output signal from the shaping circuit 202 is applied to NAND gates 212 and 213 at the respective ones of the inputs thereof and also to a NAND gate 214 at one of the inputs thereof through an inverter 215. Similarly, the output signal from the shaping circuit 202' is applied to the other input of the NAND gate 213 and to the other input of the NAND gate 214 through an inverter 215'. It is also applied to NAND gate 212' at one of the inputs thereof.

A D-type edge trigger flip-flop 216, which is substantially identical to the flip-flop 44 described in connection with the embodiment of FIG. 2, is provided which has inputs connected to the outputs of the NAND gates 213 and 214, respectively and one of the outputs of which is connected to the other inputs of the NAND gates 212 and 212'. The output signal from the NAND gate 212 may be inverted by an inverter 217, but the output signal from the NAND gate 212' is supplied as it is.

The current generators 211 and 211' may comprise main transistors 218 and 218' and auxiliary transistors 219 and 219' together with annexed resistances 220 to 224 and 220' to 224'. The output of the inverter 217 is connected to the base of the transistor 219 to which is also connected through the resistance 221 to a potential source (not shown) which is connected to another input of the flip-flop 216 as well. Similarly, the output of the NAND gate 212' is connected to the base of the transistor 219'. The collector resistances 222, 223 and 222', 223' have the points at which they are associated with each other, respectively and which are connected to the bases of the main transistors 218 and 218', the collectors of which may have a common output to each other. Lines 225 and 225', to which are connected the other ends of the collector resistances 222 and 222' and also the opposite ends of the emitter resistances 220 and 220' to the emitters of the transistors 218 and 218', are connected to a D.C. power source (not shown). It will be understood that the current generator 211 generates positive current and the current generator 211' negative current.

An integrator 226 comprising a capacitor may be provided which is connected at one of the ends thereof to the common output of the transistors 218 and 218', and the other end of the integrator is grounded to earth. The integrator 226 serves to smooth and integrate the positive or negative output from the current generators 211 and 211'.

A motor control circuit 227 is provided which comprises a control amplifier 228 in the form of a differential amplifier having one input receiving the integrated output from the integrator 226, the other input of which serves to receive the feedback signal from the output thereof. Resistances 229 to 231 and a capacitor 232 are provided on the feedback input of the amplifier 228 to determine the gain and time constant thereof. The output of the control amplifier 228 is connected to the electric motor 207 through a switch 233 which can be manually operated by the operator.

In operation, as previously described in connection with the embodiment shown in FIGS. 1 and 2, when the reference magnetic tape 2 as shown in FIG. 1 with the reference signals recorded on the respective tracks thereof engages and runs through the magnetic reproducing head 200 to be adjusted in its orientation, the magnetic head 200 reproduce the output signals from the respective tracks thereof, which signals have the phase difference therebetween if the magnetic head is not properly oriented. The output signals are amplified by the amplifiers 201 and 201' and then shaped by the shaping circuits 202 and 202' to provide signals $V_{200}$ and $V_{200}'$ of rectangular wave form at the outputs thereof as shown in FIG. 8A.

As noted from FIG. 8A, the signal $V_{200}$ from the shaping circuit 202 has advanced by the angle $\alpha$ relative to the signal $V_{200}'$ from the shaping circuit 202', which means that the magnetic head 200 is inclined as shown at the letter $G_2$ of FIG. 1. Thus, with the signal $V_{200}$ raised in advance of the signal $V_{200}'$ the signal $V_{200}$ is applied to the corresponding input of the flip-flop 216 through the inverter 215 and the NAND gate 214 and therefore, the flip-flop 216 has the output signal of high level at the output thereof. On the other hand, if the signal $V_{200}'$ is raised in advance of the signal $V_{200}$ as shown in FIG. 8B, which means that the magnetic head 200 is oriented as shown at $G_2'$ of FIG. 1, then the signal $V_{200}'$ is applied to the input of the flip-flop 216 through the corresponding inverter 215' and the NAND gate 214 and similarly, the flip-flop 216 also has the output signal of high level. Thus, it will be noted that one of the output signals from the shaping circuits 202 and 202' raised in advance of the other causes the flip-flop 216 to be set so as to have high level at the output thereof. If both of the output signals from the shaping circuits 202 and 202' are simultaneously raised, then both signals $V_{200}$ and $V_{200}'$ are applied to the input of the flip-flop 216 through the respective inverters 215 and 215' and the NAND gate 213 to cuase the flip-flop 216 to be reset to the low level thereof.

Thus, the flip-flop 216 will produce pulses $P_{200}$ or $P_{200}'$ having the width proportional to the phase difference between the signals $V_{200}$ and $V_{200}'$ at the output of the shaping circuits 202 and 202' as shown in FIGS. 8A and 8B.

If pulses from the flip-flop 216 are produced as shown $P_{200}$ based on the signal $V_{200}$ raised to high level, then the pulses $P_{200}$ together with the signals of high level are applied to the NAND gate 212 and then through the inverter 217 to the base of the transistor 219 to cause it to be in the conductive state to thereby permit the transistor 218 to be turned on to provide a positive pulse to the common output of the transistors 218 and 218'. Everytime one pulse $P_{200}$ is applied to the NAND gate 212, one positive pulse is generated which is supplied to the integrator 226 to thereby raise the integrated value of the voltage across the integrator 226 as shown at $IT_{200}$ in FIG. 8A. The voltage across the integrator 226 is amplified by the control amplifier 228 the output from which is applied across the electric motor 207 to rotate it in one direction until the magnetic head 200 is properly oriented in vertical direction. At that time, the magnetic head 200 reproduced the reference signals having the same phase so that the flip-flop 216 no longer generates pulses to thereby stop the operation of the electric motor 207 with the result that the magnetic head 200 is maintained in proper vertical orientation.

On the other hand, if pulses from the flip-flop 216 are produced as shown at $P_{200}'$ of FIG. 8B based on the signal $V_{200}'$ raised to high level, then the pulses $P_{200}'$ together with the signals of high level from the shaping circuit 202' are applied to the NAND gate 212' and then to the base of the transistor 219' to thereby cause it to be conductive. With the transistor 219' conductive, the main transistor 218' is caused to become conductive to thereby supply a negative pulse to the integrator 226. One negative pulse is generated for application of every pulse $P_{200}'$ to the NAND gate 212' and the negative pulses cause the voltage across the integrator 226 to be gradually reduced or negatively increased as shown at $IT_{200}'$ in FIG. 8B. The negative voltage across the integrator 226 is amplified by the control amplifier 228 and then applied across the electric motor to rotate it in a reverse direction until the magnetic head 200, which was inclined as shown at $G_2'$ in FIG. 1, is properly oriented in vertical direction. At that time, the reproduced signals from the magnetic head 200 have the same phase so that the flip-flop no longer generates pulses to thereby stop the electric motor 207 with the result that the magnetic head 200 is maintained in proper vertical orientation.

In the illustrated embodiment, the switch 233 is adapted to short-circuit the electric motor 207 so that it is prevented from its rotation due to noise intruded into the system.

It will be appreciated that after the adjustment of the magnetic reproducing head 200 to a proper vertical orientation, a magnetic recording head (not shown) can be adjusted through the adjusted magnetic reproducing head 200 in a manner previously described in connection with the first embodiment of FIGS. 1 and 2.

While some preferred embodiments have been described in detail by way of illustration in connection with the accompanying drawings, it will be apparent to those skilled in the art that various modifications and changes might be made without departing from the scope and spirit of the invention as set forth in the appended claims.

What is claimed is:

1. A process for detecting a vertical orientation of a magnetic reproducing head, said head having a slit gap divided into a plurality of channel portions, comprising the steps of preparing a reference tape with a plurality of A.C. signals having the same phase recorded on the respective tracks by engagement of said reference tape with a reference magnetic recording head having a slit gap disposed substantially in a direction perpendicular to its running direction, running said recorded reference tape in engagement with said reproducing head to reproduce said signals from the respective tracks of said magnetic reproducing head, deforming said reproduced signals from said respective tracks of said reproducing head to produce a first and a second rectangular wave signal, comparing the phases between said first and second rectangular wave signals based on the inclination of said magnetic reproducing head by a flip-flop in which when said first rectangular wave signal is advanced in phase relative to said second rectangular wave signal, a first output signal of "high" level and a second output signal of "low" level are produced therefrom and when said first rectangular wave signal is retarded in phase relative to said second rectangular wave signal, a first output signal of "low" level and a second output signal of "high" level are produced therefrom, and indicating the direction of inclination of said magnetic reproducing head by conducting or interrupting semiconductor switching means in response to "high" or "low" level of said first and second output signals from said flip-flop whereby said magnetic reproducing head can be adjusted so that said slit gap of said magnetic reproducing head is oriented in a properly vertical direction.

2. A process for detecting a vertical orientation of a magnetic recording head, said head having a slit gap divided into a plurality of channel portions, comprising the steps of running a blank magnetic tape having a plurality of tracks in engagement with said magnetic recording head to record a plurality of A.C. signals on the respective tracks of said magnetic tape, then running said magnetic tape with said signals recorded thereon, in engagement with a reference magnetic reproducing head with a slit gap disposed substantially in a direction perpendicular to its running direction to thereby reproduce said signals from the respective tracks of said reference magnetic reproducing head deforming said reproduced signals from said respective tracks of said reproducing head to produce a first and second rectangular wave signal, comparing the phases between said first and second rectangular wave signals based on the inclination of said magnetic recording head by a flip-flop in which when said first rectangular wave signal is advanced in phase relative to said second rectangular wave signal, a first output signal of "high" level and a second output signal of "low" level are produced therefrom and when said first rectangular wave signal is retarded in phase relative to said second rectangular wave signal, a first output signal of "low" level and a second signal of "high" level are produced therefrom, and indicating the direction of inclination of said magnetic recording head by conducting or interrupting semiconductor means in response to "high" or "low" level of said first and second output signals from said flip-flop whereby said magnetic recording head can be adjusted so that said slit gap of said magnetic recording head is oriented in a properly vertical direction.

3. An apparatus for detecting a vertical orientation of a magnetic reproducing head, said head having a slit gap divided into a plurality of channel portions, comprising a reference tape with a plurality of A.C. signals having the same phase recorded on its respective tracks by engagement of said tape with a reference magnetic recording head with a slit gap disposed substantially in a direction perpendicular to the running of said tape, deforming amplifying means to receive said reproduced signals from said respective tracks of said magnetic reproducing head to produce a first and a second rectangular wave signals, a flip-flop to receive said first and second rectangular wave signals and compare the phases between them based on the inclination of said magnetic reproducing head whereby when said first rectangular wave signal is advanced in phase relative to said second rectangular wave signal, a first output signal of "high" level and a second output signal of "low" level are produced therefrom and when said first rectangular wave signal is retarded in phase relative to said second rectangular wave signal, a first output signal of "low" level and a second output signal of "high" level are produced therefrom, and an indicator to indicate the direction of inclination of said magnetic reproducing head, said indicator including semiconductor switching means which is conductive or interruptive in response to "high" or "low" level of said first and second output signals from said flip-flop and serving to adjust said magnetic reproducing head so that said slit gap of said magnetic reproducing head is oriented in a properly vertical direction.

4. An apparatus as set forth in claim 3, wherein said indicator comprises two luminescence diodes connected to said semiconductor switching means.

5. A mounting assembly for a magnetic head adapted to adjust said head to a properly vertical orientation, comprising a base, a mounting member having an extension extending in a running direction of a magnetic tape to engage said magnetic head and resiliently and pivotally mounted on said base said magnetic head carried by said mounting member in a spaced relation from the pivotal portion of said mounting member, means resiliently urging the middle portion of said extension toward said base, an adjusting screw extending through said base and engaging against said extension at the free end thereof so that said magnetic head is as urged to be inclined in a direction reverse to that in which said magnetic head is inclined by the force on the middle portion of said extension and a resilient bush forcedly fitted to and through said base and having a hole into which said adjusting screw is forcedly threaded so that said adjusting screw is held in position by said resilient bush compressed against the outer periphery of said adjusting screw.

6. An apparatus for automatically adjusting a vertical orientation of a magnetic reproducing head, said head having a slit gap divided into a plurality of channel portions, cmprising means to support said magnetic head and movable so that said magnetic head is allowed to be adjusted in its vertical orientation, actuating means to actuate said means to support said magnetic head, a reference tape with a plurality of A.C. signals having the same phase recorded on its respective tracks by engagement of said tape with a magnetic recording head having a slit gap disposed substantially in a direction perpendicular to the running of said tape, deforming amplifying means to receive the signals reproduced from said respective tracks of said reproducing head to produce a first and a second rectangular wave signals, logic means to receive said first and second rectangular wave signals and compare the advanced of them based on the inclination of said magnetic reproducing head whereby when said first rectangular wave signal is advantaged in phase relative to said second rectangular wave signal, a first pulse signal is produced therefrom having the width proportional to the phase difference between said first and second rectangular wave signals and when said first rectangular wave signal is retarded relative to said second rectangular wave signal, a second pulse signal is produced therefrom having the width proportional to the phase difference between said first and second rectangular wave signals and when said first and said second rectangular wave signals are in the same phase, no pulse signal is produced therefrom, and control means to control said actuating means so that when said first pulse signal is received said actuating means actuates said support means in a forward direction and when said second pulse signal is received said actuating means actuates said support means in a reverse direction.

7. An apparatus as set forth in claim 6, further comprising an integrator to smooth and integrate said pulse signals, and wherein said control means receives said integrated signals.

8. An apparatus as set forth in claim 7, wherein said control means comprises differential amplifier having one input associated with said integrator and the other input associated with means to set said other input to have predetermined time constant.

* * * * *